US005622646A

United States Patent [19]

[11] Patent Number: 5,622,646

[45] Date of Patent: Apr. 22, 1997

Scialla et al.

[54] BLEACH COMPOSITIONS COMPRISING METAL-CONTAINING BLEACH CATALYSTS AND ANTIOXIDANTS

[75] Inventors: Stefano Scialla, Rome, Italy; Alastair J. Pretty, Newcastle Upon Tyne, England

[73] Assignee: The Procter & Gamble Company, Cincinnati, Ohio

[21] Appl. No.: 600,323

[22] Filed: Feb. 13, 1996

Related U.S. Application Data

[63] Continuation of Ser. No. 224,617, Apr. 7, 1994, abandoned.

[51] Int. Cl.$^6$ .......................... C01B 15/00; C01B 15/037

[52] U.S. Cl. ............................... 252/186.33; 252/186.27; 252/186.31; 252/186.38; 510/311

[58] Field of Search ......................... 252/186.27, 186.31, 252/186.33, 186.38, 186.43

[56] References Cited

U.S. PATENT DOCUMENTS

| | | | |
|---|---|---|---|
| 3,330,766 | 7/1967 | Goldwasser | 510/302 |
| 3,398,096 | 8/1968 | Rotterdam te al. | 510/368 |
| 3,551,338 | 12/1970 | Rapisarda | 510/302 |
| 4,119,557 | 10/1978 | Postlethwaite | 510/311 |
| 4,362,639 | 12/1982 | Eoga | 252/186.22 |
| 4,421,741 | 12/1983 | Gilbert et al. | 424/104 |
| 4,430,243 | 2/1984 | Bragg | 510/311 |
| 4,478,733 | 10/1984 | Oakes | 510/311 |
| 4,481,129 | 11/1984 | Oakes | 252/186.41 |
| 4,488,980 | 12/1984 | Oakes | 510/311 |
| 4,536,183 | 8/1985 | Namnath | 8/107 |
| 4,539,132 | 9/1985 | Oakes | 510/306 |
| 4,568,477 | 2/1986 | Oakes | 510/311 |
| 4,578,206 | 3/1986 | Walker | 510/376 |
| 4,579,678 | 4/1986 | Walker | 510/375 |
| 4,601,845 | 7/1986 | Namnath | 510/311 |
| 4,623,357 | 11/1986 | Urban | 8/107 |
| 4,626,373 | 12/1986 | Finch et al. | 510/311 |
| 4,626,374 | 12/1986 | Finch et al. | 510/376 |
| 4,634,551 | 1/1987 | Burns et al. | 510/313 |
| 4,655,782 | 4/1987 | McCallion et al. | 8/111 |
| 4,655,953 | 4/1987 | Oakes | 510/311 |
| 4,711,748 | 12/1987 | Irwin et al. | 264/117 |
| 4,728,455 | 3/1988 | Rerek | 510/303 |
| 4,764,302 | 8/1988 | Baker et al. | 252/301.23 |
| 4,786,421 | 11/1988 | Butterworth et al. | 252/8.8 |
| 4,892,555 | 1/1990 | Leigh et al. | 8/101 |
| 4,900,469 | 2/1990 | Farr et al. | 510/303 |
| 4,966,723 | 10/1990 | Hodge et al. | 510/372 |
| 5,002,682 | 3/1991 | Bragg et al. | 510/311 |
| 5,021,187 | 6/1991 | Harriott et al. | 252/186.38 |
| 5,114,606 | 5/1992 | van Vliet et al. | 510/311 |
| 5,114,611 | 5/1992 | Van Kralingen et al. | 252/186.33 |
| 5,153,161 | 10/1992 | Kerschner et al. | 502/167 |
| 5,194,416 | 3/1993 | Jureller et al. | 502/167 |
| 5,200,236 | 4/1993 | Lang et al. | 427/213 |
| 5,227,084 | 7/1993 | Martens et al. | 510/305 |
| 5,244,594 | 9/1993 | Favre et al. | 252/186.33 |
| 5,246,612 | 9/1993 | Van Dijk et al. | 510/226 |
| 5,246,621 | 9/1993 | Favre et al. | 252/186.33 |
| 5,256,779 | 10/1993 | Kerschner et al. | 540/465 |
| 5,274,147 | 12/1993 | Kerschner et al. | 556/45 |
| 5,280,117 | 1/1994 | Kerschner et al. | 540/465 |
| 5,284,944 | 2/1994 | Madison et al. | 540/474 |
| 5,378,387 | 1/1995 | Houghton et al. | 510/161 |

FOREIGN PATENT DOCUMENTS

| | | | |
|---|---|---|---|
| 143491 | 6/1985 | European Pat. Off. | C11D 3/39 |
| 0209228 | 1/1987 | European Pat. Off. . | |
| 224952 | 6/1987 | European Pat. Off. | C11D 3/39 |
| 306089 | 3/1989 | European Pat. Off. | C11D 3/395 |
| 0340001 | 11/1989 | European Pat. Off. . | |
| 384503 | 8/1990 | European Pat. Off. | C11D 3/395 |
| 408131 | 1/1991 | European Pat. Off. | C11D 3/39 |
| 458398 | 11/1991 | European Pat. Off. | C11D 3/395 |
| 544440 | 6/1993 | European Pat. Off. | C11D 3/39 |
| 544490 | 6/1993 | European Pat. Off. | C11D 3/39 |
| 549271 | 6/1993 | European Pat. Off. | C11D 3/39 |
| 549272 | 6/1993 | European Pat. Off. | C11D 3/39 |
| 2054019 | 10/1971 | Germany | C11D 7/42 |
| 2149418 | 6/1985 | United Kingdom | C11D 3/60 |
| 9421775 | 9/1994 | WIPO . | |

*Primary Examiner*—Sharon Gibson
*Assistant Examiner*—Joseph D. Anthony
*Attorney, Agent, or Firm*—Kim William Zerby; Brian M. Bolam; Jerry J. Yetter

[57] ABSTRACT

Bleaching compositions useful for laundering fabrics comprising a metal bleach catalyst and an effective amount of an antioxidant.

15 Claims, No Drawings

BLEACH COMPOSITIONS COMPRISING METAL-CONTAINING BLEACH CATALYSTS AND ANTIOXIDANTS

This is a continuation of application Ser. No. 08/224,671, filed on Apr. 7, 1994, now abandoned.

TECHNICAL FIELD

The present invention relates to bleaching compositions (e.g., granular detergent compositions; liquid bleach additive compositions) useful for laundering fabrics comprising a metal bleach catalyst and an effective amount of an antioxidant.

BACKGROUND OF THE INVENTION

Metal-containing catalysts have been described in bleach compositions, including manganese-containing catalysts such as those described in EP 549,271; EP 549,272; EP 458,397; U.S. Pat. No. 5,244,594; U.S. Pat. No. 5,246,621; EP 458,398; U.S. Pat. No. 5,194,416; and U.S. Pat. No. 5,114,611. These bleach catalysts are described as being active for catalyzing the bleaching action of peroxy compounds against various stains. Several of these bleaching systems are said to be effective for use in washing and bleaching of substrates, including laundry and hard surfaces (such as machine dishwashing, general cleaning) and in the textile, paper and wood pulp industries.

It has been discovered that these metal-containing bleach catalysts, especially the manganese-containing catalysts, have the particularly undesirable property, when used with textiles, of damaging the fabric resulting in loss of tensile strength of the fibers and/or producing color damage to the fabric. Obviously, such properties for compositions is a great drawback to the general use of these compositions in the laundry area. Further, such catalysts raise compatibility concerns for such bleach systems that include certain typical laundry ingredients such as perfumes, brighteners, and enzymes.

It has now been surprisingly discovered that inclusion of free radical scavenging antioxidants into laundry compositions comprising metal-containing bleach catalysts reduces the fabric damage resulting from these catalysts in the laundry process, without stopping the catalytic activity of the metal catalyst. It is a further goal of this invention to provide stable compositions containing ingredients otherwise incompatible with the metal catalyst.

These and other objects are secured herein, as will be seen from the following disclosures.

BACKGROUND ART

The use of amido-derived bleach activators in laundry detergents is described in U.S. Pat. No. 4,634,551. Another class of bleach activators comprises the benzoxazin-type activators disclosed by Hodge et al in U.S. Pat. No. 4,966,723, issued Oct. 30, 1990. The use of manganese with various complex ligands to enhance bleaching is reported in the following U.S. Pat. Nos.: 4,430,243; 4,728,455; 5,246,621; 5,244,594; 5,284,944; 5,194,416; 5,246,612; 5,256,779; 5,280,117; 5,274,147; 5,153,161; 5,227,084; 5,114,606; 5,114,611. See also: EP 549,271 A1; EP 544,490 A1; EP 549,272 A1; and EP 544,440 A2.

SUMMARY OF THE INVENTION

The present invention relates to laundry bleaching compositions having reduced metal-containing bleach catalyst-induced fabric damage, said compositions comprising:

(a) a peroxy compound present in an effective amount to cause bleaching;

(b) a metal-containing bleach catalyst (preferably a manganese bleach catalyst) present in an effective amount to activate the peroxy compound; and (c) a free radical scavenging antioxidant material in an amount effective to reduce fabric damage associated with the metal-containing bleach catalyst.

All percentages, ratios and proportions herein are by weight, unless otherwise specified. All documents cited are, in relevant part, incorporated herein by reference.

DETAILED DESCRIPTION OF THE INVENTION

Metal-Containing Bleach Catalysts

One type of bleach catalyst useful herein is a catalyst system comprising a heavy metal cation of defined bleach catalytic activity, such as copper, iron or manganese cations, an auxiliary metal cation having little or no bleach catalytic activity, such as zinc or aluminum cations, and a sequestrant having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

Other types of bleach catalysts include the manganese-based complexes disclosed in U.S. Pat. No. 5,246,621 and U.S. Pat. No. 5,244,594. Preferred examples of these catalysts include $Mn^{IV}_2(u-O)_3(1,4,7\text{-trimethyl-}1,4,7\text{-triazacyclononane})_2\text{-}(PF_6)_2$, $Mn^{III}_2(u-O)_1(u-OAc)_2(1,4,7\text{-trimethyl-}1,4,7\text{-triazacyclononane})_2(ClO_4)_2$, $Mn^{IV}_4(u-O)_6(1,4,7\text{-triazacyclononane})_4(ClO_4)_4$, $Mn^{III}Mn^{IV}_4(u-O)_1(u-OAc)_2\text{-}1,4,7\text{-trimethyl-}1,4,7\text{-triazacyclononane})_2(ClO_4)_3$, and mixtures thereof. Others are described in European patent application publication no. 549,272. Other ligands suitable for use herein include 1,5,9-trimethyl-1,5,9-triazacyclododecane, 2-methyl-1,4,7-triazacyclononane, 2-methyl-1,4,7-triazacyclononane, 1,2,4,7-tetramethyl-1,4,7-triazacyclononane, and mixtures thereof. Also included are the mononuclear manganese (IV) complexes such as $Mn^{IV}(1,4,7\text{-trimethyl-}1,4,7\text{-triazacyclononane})\ (OCH_3)_3(PF_6)$ as described in U.S. Pat. No. 5,194,416.

Still another type of bleach catalyst, as disclosed in U.S. Pat. No. 5,114,606, is a water-soluble complex of manganese (II), (III), and/or (IV) with a ligand which is a non-carboxylate polyhydroxy compound having at least three consecutive C—OH groups. Preferred ligands include sorbitol, iditol, dulsitol, mannitol, xylithol, arabitol, adonitol, meso-erythritol, meso-inositol, lactose, and mixtures thereof.

U.S. Pat. No. 5,114,611 teaches a bleach catalyst comprising a complex of transition metals, including Mn, Co, Fe, or Cu, with an non-(macro)-cyclic ligand. Said ligands are of the formula:

$$R^2R^3R^1—N{=}C—B—C{=}N—R^4$$

wherein $R^1$, $R^2$, $R^3$, and $R^4$ can each be selected from H, substituted alkyl and aryl groups such that each $R^1—N{=}C—R^2$ and $R^3—C{=}N—R^4$ form a five or sixmembered ring. Said ring can further be substituted. B is a bridging group selected from O, S. $CR^5R^6$, $NR^7$ and C═O, wherein $R^5$, $R^6$, and $R^7$ can each be H, alkyl, or aryl groups, including substituted or unsubstituted groups. Preferred ligands include pyridine, pyridazine, pyrimidine, pyrazine, imidazole, pyrazole, and triazole rings. Optionally, said rings may be substituted with substituents such as alkyl, aryl, alkoxy, halide, and nitro. Particularly preferred is the ligand 2,2'-bispyridylamine. Preferred bleach catalysts include Co, Cu, Mn, Fe,-bispyridylmethane and -bispyridylamine complexes. Highly preferred catalysts include Co(2,2'-bispyridylamine)$Cl_2$, Di(isothiocyanato)bispyridylamine-cobalt (II), trisdipyridylamine-cobalt(II) perchlorate, Co(2,2-bispyridylamine)$_2O_2ClO_4$, Bis-(2,2'-bispyridylamine) copper(II) perchlorate, tris(di-2-pyridylamine) iron(II) perchlorate, and mixtures thereof.

Other examples include Mn gluconate, $Mn(CF_3SO_3)_2$, $Co(NH_3)_5Cl$, and the binuclear Mn complexed with tetra-N-dentate and bi-N-dentate ligands, including $N_4Mn^{III}$(u-O)$_2Mn^{IV}N_4)^+$ and $[Bipy_2Mn^{III}(u\text{-}O)_2Mn^{IV}bipy_2]\text{-}(ClO_4)_3$.

The bleach catalysts of the present invention may also be prepared by combining a water-soluble ligand with a water-soluble manganese salt in aqueous media and concentrating the resulting mixture by evaporation. Any convenient water-soluble salt of manganese can be used herein. Manganese (II), (III), (IV) and/or (V) is readily available on a commercial scale. In some instances, sufficient manganese may be present in the wash liquor, but, in general, it is preferred to add Mn cations in the compositions to ensure its presence in catalytically-effective amounts. Thus, the sodium salt of the ligand and a member selected from the group consisting of $MnSO_4$, $Mn(ClO_4)_2$ or $MnCl_2$ (least preferred) are dissolved in water at molar ratios of ligand:Mn salt in the range of about 1:4 to 4:1 at neutral or slightly alkaline pH. The water may first be de-oxygenated by boiling and cooled by sparging with nitrogen. The resulting solution is evaporated (under $N_2$, if desired) and the resulting solids are used in the bleaching and detergent compositions herein without further purification.

In an alternate mode, the water-soluble manganese source, such as $MnSO_4$, is added to the bleach/cleaning composition or to the aqueous bleaching/cleaning bath which comprises the ligand. Some type of complex is apparently formed in situ, and improved bleach performance is secured. In such an in situ process, it is convenient to use a considerable molar excess of the ligand over the manganese, and mole ratios of ligand:Mn typically are 3:1 to 15:1.The additional ligand also serves to scavenge vagrant metal ions such as iron and copper, thereby protecting the bleach from decomposition. One possible such system is described in European patent application, publication no. 549,271.

While the structures of the bleach-catalyzing manganese complexes of the present invention have not been elucidated, it may be speculated that they comprise chelates or other hydrated coordination complexes which result from the interaction of the carboxyl and nitrogen atoms of the ligand with the manganese cation. Likewise, the oxidation state of the manganese cation during the catalytic process is not known with certainty, and may beg the (+II), (+III), (+IV) or (+V) valence state. Due to the ligands' possible six points of attachment to the manganese cation, it may be reasonably speculated that multi-nuclear species and/or "cage" structures may exist in the aqueous bleaching media. Whatever the form of the active Mn-ligand species which actually exists, it functions in an apparently catalytic manner to provide improved bleaching performances on stubborn stains such as tea, ketchup, coffee, blood, and the like.

Other bleach catalysts are described, for example, in European patent application, publication no. 408,131 (cobalt complex catalysts), European patent applications, publication nos. 384,503, and 306,089 (metallo-porphyrin catalysts), U.S. Pat. No. 4,728,455 (manganese/multidentate ligand catalyst), U.S. Pat. No. 4,711,748 and European patent application, publication no. 224,952, (absorbed manganese on aluminosilicate catalyst), U.S. Pat. No. 4,601,845 (aluminosilicate support with manganese and zinc or magnesium salt), U.S. Pat. No. 4,626,373 (manganese/ligand catalyst), U.S. Pat. No. 4,119,557 (ferric complex catalyst), German Pat. specification 2,054,019 (cobalt chelant catalyst) Canadian 866,191 (transition metal-containing salts), U.S. Pat. No. 4,430,243 (chelants with manganese cations and non-catalytic metal cations), and U.S. Pat. No. 4,728,455 (manganese gluconate catalysts).

The bleach catalyst is used in a catalytically effective amount in the compositions and processes herein. By "catalytically effective amount" is meant an amount which is sufficient, under whatever comparative test conditions are employed, to enhance bleaching and removal of the stain or stains of interest from the target substrate. Thus, in a fabric laundering operation, the target substrate will typically be a fabric stained with, for example, various food stains. The test conditions will vary, depending on the type of washing appliance used and the habits of the user. Thus, front-loading laundry washing machines of the type employed in Europe generally use less water and higher detergent concentrations than do top-loading U.S.-style machines. Some machines have considerably longer wash cycles than others. Some users elect to use to very hot water; others use warm or even cold water in fabric laundering operations. Of course, the catalytic performance of the bleach catalyst will be affected by such considerations, and the levels of bleach catalyst used in fully-formulated detergent and bleach compositions can be appropriately adjusted.

As a practical matter, and not by way of limitation, the compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 500 ppm, of the catalyst species in the laundry liquor. To illustrate this point further, on the order of 3 micromolar manganese catalyst is effective at 40° C., pH 10 under European conditions using perborate and a bleach activator (e.g., benzoyl caprolactam). An increase in concentration of 3–5 fold may be required under U.S. conditions to achieve the same results. Conversely, use of a bleach activator and the manganese catalyst with perborate may allow the formulator to achieve equivalent bleaching at lower perborate usage levels than products without the manganese catalyst.

The compositions herein will therefore typically comprise from about 1 ppm to about 1200 ppm of the metal-containing bleach catalyst, preferably from about 5 ppm to about 800 ppm, and more preferably from about 10 ppm to about 600 ppm. Most preferred compositions comprise the bleach catalyst $Mn^{IV}_2$(u-O)$_3$(1,4,7-trimethyl-1,4,7-triazacyclononane)$_2$-$(PF_6)_2$ in a concentration of from about 30 ppm to about 1000 ppm, preferably from about 50 ppm to about 650 ppm, more preferably from about 50 ppm to about 500ppm, and most preferably from about 120 ppm to about 400 ppm.

Peroxy Compounds

It is to be appreciated that the bleach catalyst does not function as a bleach by itself. Rather, it is used as a catalyst to enhance the performance of conventional bleaches and, in particular, oxygen bleaching agents such as perborate, percarbonate, persulfate, and the like, especially in the presence of bleach activators. Accordingly, the compositions herein also contain peroxy compounds which as used herein includes bleaching agents and bleaching mixtures containing a bleaching agent and one or more bleach activators, in an amount sufficient to provide bleaching of the stain or stains of interest (e.g., tea stains; wine stains). Bleaching agents will typically be at levels of from about 1% to about 80%, more typically from about 5% to about 20%, of the detergent composition, especially for fabric laundering. Bleach and pre-soak compositions may comprise from 5% to 99% of the bleaching agent. If present, the amount of bleach activators will typically be from about 0.1% to about 60%, more typically from about 0.5% to about 40% of the bleaching mixture comprising the bleaching agent-plus-bleach activator.

1. Bleaching Agents:

The bleaching agents used herein can be any of the bleaching agents useful for detergent or bleaching compositions in textile cleaning, hard surface cleaning, or other cleaning purposes that are now known or become known, and are useful for bleaching compositions as used in the present invention to treat fabrics. These include oxygen bleaches as well as other bleaching agents. Perborate bleaches, e.g., sodium perborate (e.g., mono- or tetra-hydrate) can be used herein.

Peroxygen bleaching agents are preferably used in the compositions. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

As used herein, bleaching agents also comprise preformed organic percarboxylic acids. Such bleaching agents that can be used without restriction encompass percarboxylic acid bleaching agents and salts thereof. Suitable examples of this class of agents include magnesium monoperoxyphthalate hexahydrate (INTEROX), the magnesium salt of metachloro perbenzoic acid, 4-nonylamino-4oxoperoxybutyric acid and diperoxydodecanedioic acid. Such bleaching agents are disclosed in U.S. Pat. No. 4,483,781,Hartman, issued Nov. 20, 1984, U.S. patent application Ser. No. 740,446, Burns et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid (NAPAA) as described in U.S. Pat. No. 4,634,551, issued Jan. 6, 1987 to Burns et al.

Such materials normally have a general formula:

HO—O—C(O)—R—Y wherein R is an alkylene or substituted alkylene group containing from 1 to about 22 carbon atoms or a phenylene or substituted phenylene group, and Y is hydrogen, halogen, alkyl, aryl or

—C(O)—OH or

—C(O)—O—OH

The organic percarboxylic acids usable in the present invention can contain either one or two peroxy groups and can be either aliphatic or aromatic. When the organic percarboxylic acid is aliphatic, the unsubstituted acid has the general formula:

$HO—O—C(O)—(CH_2)_n—Y$ where Y can be, for example, H, $CH_3$, $CH_2Cl$, COOH, or COOOH; and n is an integer from 1 to 20.

When the organic percarboxylic acid is aromatic, the unsubstituted acid has the general formula:

$HO—O—C(O)—C_6H_4—Y$ wherein Y is hydrogen, alkyl, alkyhalogen, halogen, or COOH or COOOH.

Typical monoperoxy percarboxylic acids useful herein include alkyl percarboxylic acids and aryl percarboxylic acids such as:

(i) peroxybenzoic acid and ring-substituted peroxybenzoic acids, e.g., peroxy-o-naphthoic acid;

(ii) aliphatic, substituted aliphatic and arylalkyl monoperoxy acids, e.g. peroxylauric acid, peroxystearic acid, land N,N-phthaloylaminoperoxycaproic acid (PAP).

Typical diperoxy percarboxylic acids useful herein include alkyl diperoxy acids and aryldiperoxy acids, such as:

(iii) 1,12-diperoxydodecanedioic acid;

(iv) 1,9-diperoxyazelaic acid;

(v) diperoxybrassylic acid; diperoxysebacic acid and diperoxyisophthalic acid;

(vi) 2-decyldiperoxybutane-1,4-dioic acid;

(vii) 4,4'-sulfonybisperoxybenzoic acid.

The present invention may further encompass bleaching compositions comprising an effective amount of a substantially insoluble organic percarboxylic acid bleaching agent having the general formula:

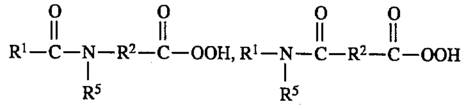

wherein $R^1$ is an alkyl, aryl, or alkary group containing from about 1 to about 14 carbon atoms, $R^2$ is an alkylene, arylene or alkarylene group containing from about 1 to about 14 carbon atoms, and $R^5$ is H or an alkyl, aryl, or alkaryl group containing from about 1 to about 10 carbon atoms.

Peroxygen bleaching agents, the perborates, the percarbonates, etc., are preferably combined with bleach activators, which lead to the in situ production in aqueous solution (i.e., during the Washing process) of the percarboxylic acid corresponding to the bleach activator.

2. Bleach Activators

Bleach activators are known and amply described in literature, such as in the GB Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393.

A class of bleach activators is that of the quaternary ammonium substituted peroxyacid activators as disclosed in U.S. Pat. Nos. 4,751,015 and 4,397,757, in EP-A-284292, EP-A-331,229 and EP-A-03520. Examples of peroxyacid bleach activators of this class are:

2-(N,N,N-trimethyl ammonium) ethyl-4-sulphophenyl carbonate-(SPCC);

N-octyl,N,N-dimethyl-N 10-carbophenoxy decyl ammonium chloride-(ODC);

3-(N,N,N-trimethyl ammonium) propyl sodium-4-sulphophenyl carboxylate; and

N,N,N-trimethyl ammonium toluyloxy benzene sulphonate.

Other activators include sodium-4-benzoyloxy benzene sulphonate; N,N,N',N'-tetracetyl ethylene diamine; sodium-1-methyl-2-benzoyloxy benzene-4-sulphonate; sodium-4-methyl-3-benzoyloxy benzoate; sodium nonanoyloxybenzene sulphonate; sodium 3,5,5,-trimethyl hexanoyloxybenzene sulphonate; glucose pentaacetate and tetraacetyl xylose.

Bleach activators of also useful in the present invention are amide substituted compounds of the general formulas:

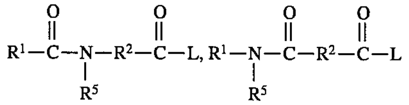

or mixtures thereof, wherein $R^1$ is an alkyl, aryl, or alkaryl group containing from about 1 to about 14 carbon atoms, $R^2$ is an alkylene, arylene or alkarylene group containing from about 1 to about 14 carbon atoms, $R^5$ is H or an alkyl, aryl, or alkaryl group containing from about 1 to about 10 carbon atoms, and L can be essentially any suitable leaving group. A leaving group is any group that is displaced from the bleaching activator as a consequence of the nucleophilic attack on the bleach activator by the perhydroxide anion. This, the perhydrolysis reaction, results in the formation of the peroxycarboxylic acid. Generally, for a group to be a suitable leaving group it must exert an electron attracting effect. It should also form a stable entity so that the rate of the back reaction is negligible. This facilitates the nucleophilic attack by the perhydroxide anion.

The L group must be sufficiently reactive for the reaction to occur within the optimum time frame (e.g., a wash Cycle). However, if L is too reactive, this activator will be difficult to stabilize for use in a bleaching composition. These characteristics are generally paralleled by the pKa of the conjugate acid of the leaving group, although exceptions to this convention are known. Ordinarily, leaving groups that exhibit such behavior are those in which their conjugate acid has a pKa in the range of from about 4 to about 13, preferably from about 6 to about 11 and most preferably from about 8 to about 11.

Preferred bleach activators are those of the above general formula wherein $R^1$ , $R^2$ and $R^5$ are as defined for the peroxyacid and L is selected from the group consisting of:

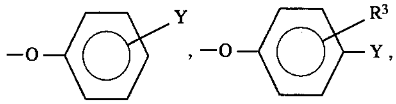

, and

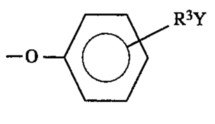

-continued

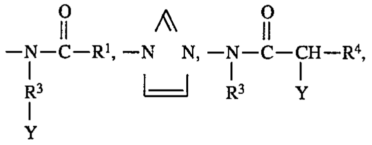

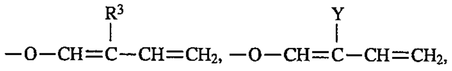

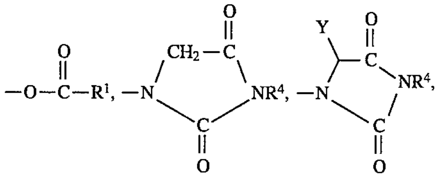

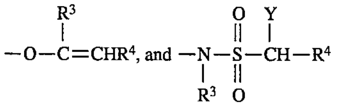

and mixtures thereof, wherein $R^1$ is a alkyl, aryl, or alkaryl group containing from about 1 to about 14 carbon atoms, $R^3$ is an alkyl chain containing from 1 to about 8 carbon atoms. $R^4$ is H or $R^3$, and Y is H or a solubilizing group.

The preferred solubilizing groups are $—SO_3^-M^+$, $—CO_2^-M^+$, $—SO_4^-M^+$, $—N^+(R^3)_4X^-$ and $O\leftarrow—N(R^3)_3$ and most preferably $—SO_3^-M^+$ and $—CO_2^-M^+$ wherein $R^3$ is an alkyl chain containing from about 1 to about 4 carbon atoms, M is a cation which provides solubility to the bleach activator and X is an union which provides solubility to the bleach activator. Preferably, M is an alkali metal, ammonium or substituted ammonium cation, with sodium and potassium being most preferred, and X is a halide, hydroxide, methylsulfate or acetate anion. It should be noted that bleach activators With a leaving group that does not contain a solubilizing groups should be well dispersed in the bleaching solution in order to assist in their dissolution. Preferred bleach activators are those of the above general formula wherein L is selected from the group consisting of:

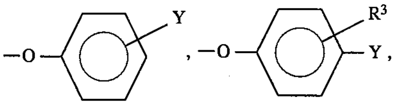

, and

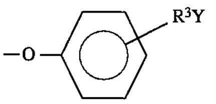

wherein $R^3$ is as defined above and Y is $—SO_3^-M^+$ or $—CO_2^-M^+$ wherein M is as defined above.

Preferred examples of bleach activators of the above formulae include (6octanamidocaproyl)oxybenzenesulfone, (6-nonanamidocaproyl)oxybenzenesulfonate, (6-decanamidocaproyl)oxybenzenesulfonate, and mixtures thereof.

Another important class of bleach activators provide organic peracids as described herein by ring-opening as a consequence of the nucleophilic attack on the carbonyl carbon of the cyclic ring by the perhydroxide anion. For instance, this ring-opening reaction in certain activators involves attack at the lactam ring carbonyl by hydrogen peroxide or its anion. Since attack of an acyl lactam by hydrogen peroxide or its anion occurs preferably at the exocyclic carbonyl, obtaining a significant fraction of ring-opening may require a catalyst. Another example of ring-opening bleach activators can be found in other activators, such as those disclosed in U.S. Pat. No. 4,966,723, Hodge et al, issued Oct. 30, 1990.

Such activator compounds disclosed by Hodge include the activators of the benzoxazin-type, having the formula:

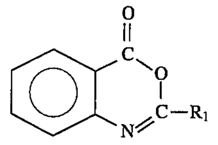

including the substituted benzoxazins of the type

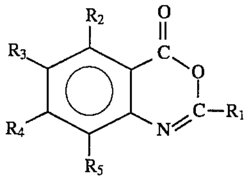

wherein $R_1$ is H, alkyl, alkaryl, aryl, arylalkyl, and wherein $R_2$, $R_3$, $R_4$, and $R_5$ may be the same or different substituents selected from H, halogen, alkyl, alkenyl, aryl, hydroxyl, alkoxyl, amino, alkyl amino, $COOR_6$ (wherein $R_6$ is H or an alkyl group) and carbonyl functions.

A preferred activator of the benzoxazin-type is:

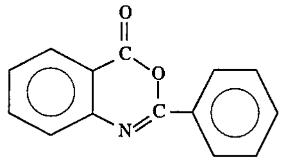

When the activators are used, optimum surface bleaching performance is obtained with washing solutions wherein the pH of such solution is between about 8.5 and 10.5 and preferably between 9.5 and 10.5 in order to facilitate the perhydrolysis reaction. Such pH can be obtained with substances commonly known as buffering agents, which are optional components of the bleaching systems herein.

Still another class of preferred bleach activators includes the acyl lactam activators, especially acyl caprolactams and acyl valerolactams of the formulae:

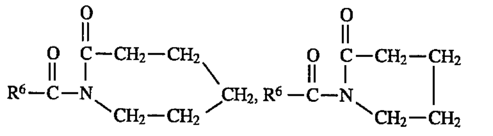

wherein $R^6$ is H, an alkyl, aryl, alkoxyaryl, or alkaryl group containing from 1 to about 12 carbon atoms, or a substituted phenyl group containing from about 6 to about 18 carbons. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Various nonlimiting examples of additional activators which may comprise the bleach compositions disclosed herein include those in U.S. Pat. No. 4,915,854, issued Apr. 10, 1990 to Mao et al, and U.S. Pat. No. 4,412,934. The nonanoyloxybenzene sulfonate (NOBS) and tetraacetyl ethylene diamine (TAED) activators are typical, and mixtures thereof can also be used. See also U.S. Pat. No. 4,634,551 for other typical bleaches add activators useful herein.

The superior bleaching/cleaning action of the present compositions is also preferably achieved with safety to natural rubber machine parts and other natural rubber articles, including fabrics containing natural rubber and natural rubber elastic materials. The bleaching mechanism and, in particular, the surface bleaching mechanism are not completely understood. However, it is generally believed that the bleach activator undergoes nucleophilic attack by a perhydroxide anion, which is generated from the hydrogen peroxide evolved by the peroxygen bleach, to form a peroxycarboxylic acid. This reaction is commonly referred to as perhydrolysis.

The amido-derived and lactam bleach activators herein can also be used in combination with preferably rubber-safe, enzyme-safe, hydrophilic activators such as TAED, typically at weight ratios of amido-derived or caprolactam activators:TAED in the range of 1:5 to 5:1, preferably about 1:1.

Free Radical Scavenging Antioxidant Materials:

"Free radical scavenging antioxidant materials", as used herein, means those materials which act to prevent oxidation in products by functioning as free radical scavengers. Examples of antioxidants that can be added to the compositions of this invention include a mixture of ascorbic acid, ascorbic palmitate, propyl gallate, available from Eastman Chemical Products, Inc., under the trade names TenoxR PG and Tenox S-1; a mixture of BHT (butylated hydroxytoluene), BHA (butylated hydroxyanisole), propyl gallate, and citric acid, available from Eastman Chemical Products, Inc., under the trade name Tenox-6; butylated hydroxytoluene, available from UOP Process Division under the trade name SustaneR BHT; tertiary butylhydroquinone, Eastman Chemical Products, Inc., as Tenox TBHQ; natural tocopherols, Eastman Chemical Products, Inc., as Tenox GT-1/GT-2; and butylated hydroxyanisole, Eastman Chemical Products, Inc., as BHA; long chain esters ($C_8$–$C_{22}$) of gallic acid, e.g., dodecyl gallate; IrganoxR 1010; IrganoxR 1035; IrganoxR B 1171; IrganoxR 1425; IrganoxR 3114; IrganoxR 3125; mono-tert-butyl hydroquinone (MTBHQ); benzoic acid and salts thereof; toluic acids and salts thereof; t-butyl catechol; 1,1,3-tris(2-methyl-4-hydroxy-5-t-butylphenyl) butane (Topanol CA available from ICI); monoalkyl ethers of hydroquinone (e.g., 4methoxyphenol); and mixtures thereof.

Preferred are BHT, BHA, TBHQ, propyl gallate, ascorbic acid, and mixtures thereof.

It is to be recognized that for purposes of the present invention, materials otherwise useful as antioxidants which do not act as free radical scavengers, such as those materials which function solely by chelating metals which can initiate oxidation reactions are not "free radical scavenging antioxidant materials" herein, but are preferred optional material to be used with the free radical scavenging antioxidant materials.

The term "antioxidant effective amount", as used herein, means an amount of a free radical scavenging antioxidant material effective for reducing, under whatever comparative test conditions are employed, the extent of any fabric damage (including, for example, tensile strength loss and/or color damage) observed by the presence of the metal-containing bleach catalyst in the composition. Such fabric damage may be evaluated under any typical wash conditions, including the greater than 40° C. wash conditions common in Europe. Levels of free radical scavenging antioxidant materials to be used in products are therefore easily determined, and are typically present in the compositions according to the present invention within the range of from about 1 ppm to about 2%, preferably from about 20 ppm to about 6000 ppm, and most preferably from about 50 ppm to about 2000ppm. Further, in a powder formulation, the antioxidant may be introduced into the formulation as a powder or through agglomeration or granulation or any other process to keep the catalyst and antioxidant close to each other and thereby allow quick interaction in the wash.

Adjunct Ingredients

The compositions herein can optionally include one or more other detergent adjunct materials or other materials for assisting or enhancing cleaning performance, treatment of the substrate to be cleaned, or to modify the aesthetics of the detergent composition (e.g., perfumes, color, ants, dyes, etc.). Preferably, the adjunct ingredients should have good stability with the bleaches employed herein. Preferably, the detergent compositions herein should be boron-free and phosphate-free. Additionally, dishcare formulations are preferably chlorine-free. The following are illustrative examples of such adjunct materials.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Liquid formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Examples of silicate builders are the alkali metal silicates, particularly those having a $SiO_2$ :$Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1}\cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are Useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z(zAlO_2)y]\cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}]\cdot xH_2O$$

wherein x is from about 20 to about 30, especially about 27. This material is known as Zeolite A. Dehydrated zeolites (x=0–10) may also be used herein. Preferably, the aluminosilicate has a particle size Of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Citrate builders, e.g., citric acid and soluble salts thereof (particularly sodium salt), are polycarboxylate builders of particular importance for detergent formulations due to their availability from renewable resources and their biodegradability. Citrates can be used in liquids or in granular compositions, especially in combination with aeolite and/or layered silicate builders. Oxydisuccinates are also especially useful in such compositions and combinations.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphors-based builders can be used, and especially in the formulation of bars used for hand-laundering operations, the various alkali metal phosphates such as the well-known sodium tripolyphosphates, sodium pyrophosphate and sodium orthophosphate can be used.

Chelating Agents—Although builders can be used, the detergent compositions herein preferably do not contain those manganese chelating agents which abstract the manganese from the bleach catalyst complex. In particular, phosphonates, phosphates, and the aminophosphonate chelating agents such as DEQUEST are preferably not used in the compositions. However, nitrogen-based manganese chelating agents, such as ethylenediamine-N,N'-disuccinate (EDDS), are useful.

Detersive Surfactants—Nonlimiting examples of surfactants useful herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Suitable nonionic surfactants particularly suitable for dishcare are the low-foaming or non-foaming ethoxylated straight-chain alcohols such as Plurafac™ RA series, supplied by Eurane Co., Lutensol™ LF series, supplied by BASF Co., Triton™ DF series, supplied by Rohm & Haas Co., and Synperonic™ LF series, supplied by ICI Co.

Clay Soil Removal/Anti-redeposition Agents—The compositions of the present invention can also optionally contain water-soluble ethoxylated amines having clay soil removal and antiredeposition properties. Granular detergent compositions which contain these compounds typically contain from about 0.01% to about 10.0% by weight of the water-soluble ethoxylates amines; liquid detergent compositions typically contain about 0.01% to about 5%.

The most preferred soil release and anti-redeposition agent is ethoxylated tetraethylenepentamine. Exemplary ethoxylated amines are further described in U.S. Pat. No. 4,597,898, VanderMeer, issued Jul. 1, 1986. Another group of preferred clay soil removal-antiredeposition agents are the cationic compounds disclosed in European Patent Application 111,965, Oh and Gosselink, published Jun. 27, 1984. Other clay soil removal/antiredeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. Another type of preferred antiredeposition agent includes the carboxy methyl cellulose (CMC) materials. These materials are well known in the art.

Polymeric Dispersing Agents—Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders. Dispersing agents such as polyaspartate preferably have a molecular weight (avg.) of about 10,000.

Enzymes—Enzymes can be included in the formulations herein for a wide variety of fabric laundering purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may: also be included. They may be of any suitable origin, such as vegetable, animal, bacterial, fungal and yeast origin. However, their choice is governed by several factors such as pH-activity and/or stability optima, thermostability, stability versus active detergents, builders and so on. In this respect bacterial or fungal enzymes are preferred, such as bacterial amylases and proteases, and fungal cellulases.

Enzymes are normally incorporated at levels sufficient to provide up to about 5 mg by weight, more typically about, 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of B. subtilis and B. licheniforms. Another suitable protease is obtained from a strain of Bacillus, having maximum activity throughout the pH range of 8–12, developed and sold by Novo Industries A/S under the registered trade name ESPERASE. The preparation of this enzyme and analogous enzymes is described in British Patent Specification No. 1,243,784 of Novo. Proteolytic enzymes suitable for removing protein-based stains that are commercially available include those sold under the tradenames ALCALASE and SAVINASE by Novo Industries A/S (Denmark) and MAXATASE by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

Amylases include, for example, α-amylases described in British Patent Specification No. 1,296,839 (Novo), RAPIDASE, International Bio-Synthetics, Inc. and TERMAMYL, Novo Industries.

The cellulase usable in the present invention include both bacterial or fungal cellulase. Preferably, they will have a pH optimum of between 5 and 9.5.

Suitable lipase enzymes for detergent usage include those produced by microorganisms of the Pseudomonas group, such as Pseudomonas stutzeri ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex Chromobacter viscosum, e.g. Chromobacter viscosum var. lipolyticum NRRLB 3673, commercially available from Toyo Jozo Co., Tagata, Japan; and further Chromobacter viscosum lipases from U.S. Biochemical Corp., U.S.A. and Disoynth Co., The Netherlands, and lipases ex Pseudomonas gladioli. The LIPOLASE enzyme derived from Humicola lanuginosa and commercially available from Novo (see also EPO 341,947) is a preferred lipase for use herein.

Peroxidase enzymes are used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985, both. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

Enzyme Stabilizers—The enzymes employed herein may be stabilized by the presence of water-soluble sources of calcium and/or magnesium ions in the finished compositions which provide such ions to the enzymes. (Calcium ions are generally somewhat more effective than magnesium ions and are preferred herein if only one type of cation is being used.) Additional stability can be provided by the presence of various other art-disclosed stabilizers especially borate species: see Severson, U.S. Pat. No. 4,537,706. Typical detergents, especially liquids, will comprise from about 1 to about 30, preferably from about 2 to about 20, more preferably from about 5 to about 15, and most preferably from About 8 to about 12, millimoles of calcium ion per liter of finished composition. This can vary somewhat, depending on the amount of enzyme present and its response to the calcium or magnesium ions. The level of calcium or magnesium ions should be selected so that there is always some minimum level available for the enzyme, after allowing for complexation with builders, fatty acids, etc., in the composition. Any water-soluble calcium or magnesium salt can be used as the source of calcium or magnesium ions, including, but not limited to, calcium chloride, calcium sulfate, calcium malate, calcium maleate, calcium hydroxide, calcium formate, and calcium acetate, and the corresponding magnesium salts. A small amount of calcium ion, generally from about 0.05 to about 0.4 millimoles per liter, is often also present in the composition due to calcium in the enzyme slurry and formula water. If solid detergent compositions the formulation may include a sufficient quantity of a water-soluble calcium ion source to provide such amounts in the laundry liquor. In the alternative, natural water hardness may suffice.

It is to be understood that the foregoing levels of calcium and/or magnesium ions are sufficient to provide enzyme stability. More calcium and/or magnesium ions can be added to the compositions to provide an additional measure of grease removal performance. Accordingly, as a general proposition the compositions herein will typically comprise from about 0.05% to about 2% by weight of a water-soluble source of calcium or magnesium ions, or both. The amount can vary, of course, with the amount and type of enzyme employed in the composition.

The compositions herein may also optionally, but preferably, contain various additional stabilizers, especially borate-type stabilizers. Typically, such stabilizers will be used at levels in the compositions from about 0.25% to about 10%, preferably from about 0.5% to about 5%, more preferably from about 0.75% to about 3%, by weight of boric acid or other borate compound capable of forming boric acid in the composition (calculated on the basis of boric acid). Boric acid is preferred, although other compounds such as boric oxide, borax and other alkali metal borates (e.g., sodium ortho-, meta- and pyroborate, and sodium pentaborate) are suitable. Substituted boric acids (e.g., phenylboronic acid, butane boronic acid, and p-bromo phenylboronic acid) can also be used in place of boric acid.

Brightener—Any optical brighteners or other brightening or whitening agents known in the art can be incorporated at levels typically from about 0.05% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Attic White CWD, available from Hilton-Davis, located in Italy; the 2-(4-stryl-phenyl)-2H-napthol[1,2-d]triazoles; 4,4'-bis-(1,2,3-triazol-2-yl)-stilbenes; 4,4'-bis(stryl)bisphenyls; and the aminocoumarins. Specific examples of these brighteners include 4-methyl-7-diethyl- amino coumarin; 1,2-bis(-venzimidazol-2-yl)ethylene; 1,3-diphenyl-phrazolines; 2,5-bis-(benzoxazol-2-yl)thiophene; 2-strylnapth-[1,2-d]oxazole; and 2-(stilbene-4-yl)-2H-naphtho- [1,2-d]triazole. See also U.S. Pat. No. 3,646,015, issued Feb. 29, 1972 to Hamilton. Anionic brighteners are preferred herein.

Suds Suppressors—Compounds for reducing or suppressing the formation of suds can be incorporated into the compositions of the present invention. Suds suppression can be of particular importance in the so-called "high concentration cleaning process" and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc. Other suds inhibitors include N-alkylated amino triazines such as tri- to hexa-alkylmelamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., K, Na, and Li) phosphates and phosphate esters. The hydrocarbons such as paraffin and haloparaffin can be utilized in liquid form. The liquid hydrocarbons will be liquid at room temperature and atmospheric pressure, and will have a pour point in the range of about −40° C. and about 50° C., and a minimum boiling point not less than about 110° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described, for example, in U.S. Pat. No. 4,265,779, issued May 5, 1981 to Gandolfo et al. The hydrocarbons, thus, include aliphatic, alicyclic, aromatic, and heterocyclic saturated or unsaturated hydrocarbons having from about 12 to about 70 carbon atoms. The term "paraffin," as used in this suds suppressor discussion, is intended to include mixtures of true paraffins and cyclic hydrocarbons.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Other silicone suds suppressors are disclosed in U.S. Pat. No. 3,455,839 which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions ate disclosed in U.S. Pat. No. 3,933,672, Bartolotta et al, and in U.S. Pat. No. 4,652,392, Baginski et al, issued Mar. 24, 1987.

An exemplary silicone based suds suppressor for use herein is a suds suppressing amount of a suds controlling agent consisting essentially of:

(i) polydimethylsiloxane fluid having a viscosity of from about 20 cs. to about 1,500 cs. at 25° C.;

(ii) from about 5 to about 50 parts per 100 parts by weight of (i) of siloxane resin composed of $(CH_3)_3SiO_{1/2}$ units of $SiO_2$ units in a ratio of from $(CH_3)_3$ $SiO_{1/2}$ units and to $SiO_2$ units of from about 0.6:1 to about 1.2:1; and (iii) from about 1 to about 20 parts per 100 parts by weight of (i) of a solid silica gel.

In the preferred silicone suds suppressor used herein, the solvent for a continuous phase is made up of certain polyethylene glycols or polyethylenepolypropylene glycol copolymers or mixtures thereof (preferred), or polypropylene glycol. The primary silicone suds suppressor is branched/crosslinked and preferably not linear.

To illustrate this point further, typical liquid laundry detergent compositions with controlled suds will optionally comprise from about 0.001 to about 1, preferably from about 0.01 to about 0.7, most preferably from about 0.05 to about 0.5, weight % of said silicone suds suppressor, which comprises (1) a nonaqueous emulsion of a primary antifoam agent which is a mixture of (a) a polyorganosiloxane, (b) a resinous siloxane or a silicone resin-producing silicone compound, (c) a finely divided filler material, and (d) a catalyst to promote the reaction of mixture components (a), (b) and (c), to form silanolates; (2) at least one nonionic silicone surfactant; and (3) polyethylene glycol or a copolymer of polyethylene-polypropylene glycol having a solubility in water at room temperature of more than about 2 weight %; and without polypropylene glycol. Similar amounts can be used in granular compositions, gels, etc. See also U.S. Pat. No. 4,978,471, Starch, issued Dec. 18, 1990, and U.S. Pat. No. 4,983,316, Starch, issued Jan. 8, 1991, U.S. Pat. No. 5,288,431, Huber et al., issued Feb. 22, 1994, and U.S. Pat. Nos. 4,639,489 and 4,749,740, Aizawa et al at column 1, line 46 through column 4, line 35.

The silicone suds suppressor herein preferably comprises polyethylene glycol and a copolymer of polyethylene glycol/polypropylene glycol, all having an average molecular weight of less than about 1,000, preferably between about 100 and 800. The polyethylene glycol and polyethylene/polypropylene copolymers herein have a solubility in water at room temperature of more than about 2 weight %, preferably more than about 5 weight %.

The preferred solvent herein is polyethylene glycol having an average molecular weight of less than about 1,000, more preferably between about 100 and 800, most preferably between 200 and 400, and a copolymer of polyethylene glycol/polypropylene glycol, preferably PPG 200/PEG 300. Preferred is a weight ratio of between about 1:1 and 1:10, most preferably between 1:3 and 1:6, of polyethylene glycol:copolymer of polyethylene-polypropylene glycol.

The preferred silicone suds suppressors used herein do not contain polypropylene glycol, particularly of 4,000 molecular weight. They also preferably do not contain block copolymers of ethylene oxide and propylene oxide, like PLURONIC L101.

Other suds suppressors useful herein comprise the secondary alcohols (e.g., 2-alkyl alkanols) and mixtures of such alcohols with silicone oils, such as the silicones disclosed in U.S. Pat. Nos. 4,798,679, 4,075,118 and EP 150,872. The secondary alcohols include the $C_6$–$C_{16}$ alkyl alcohols having a $C_1$–$C_{16}$ chain. A preferred alcohol is 2-butyl octanol, which is available from Condea under the trademark ISOFOL 12. Mixtures of secondary alcohols are available under the trademark ISALCHEM 123 from Enichem. Mixed suds suppressors typically comprise mixtures of alcohol+silicone at a weight ratio of 1:5 to 5:1.

For any detergent compositions to be used in automatic laundry washing machines, suds should not form to the extent that they overflow the washing machine. Suds suppressors, when utilized, are preferably present in a "suds suppressing amount. By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0% to about 5% of suds suppressor. When utilized as suds suppressors, monocarboxylic fatty acids, and salts therein, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%–3% by weight of the finished compositions.

Fabric Softeners—Various through-the-wash fabric softeners, especially the impalpable smectite clays of U.S. Pat. No. 4,062,647, Storm and Nirschl, issued Dec. 13, 1977, as well as other softener clays known in the art, can optionally be used typically at levels of from about 0.5% to about 10% by weight in the present compositions to provide fabric softener benefits concurrently with fabric cleaning. Clay softeners can be used in combination with amine and cationic softeners as disclosed, for example, in U.S. Pat. No. 4,375,416, Crisp et al, Mar. 1, 1983 and U.S. Pat. No. 4,291,071, Harris et al, issued Sep. 22, 1981.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R—$A_x$—P; wherein P is a polymerizable unit to which an N-O group can be attached or the N-O group can form part of the polymerizable unit or the N-O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N-O group can be attached or the N-O group is part of these groups. Preferred polyamine N-oxides are those wherein R is a heterocyclic group such as pyridine, pyrrole, imidazole, pyrrolidine, piperidine and derivatives thereof.

The N-O group can be represented by the following general structures:

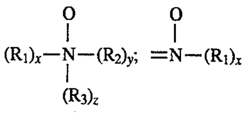

wherein $R_1$, $R_2$, $R_3$ are aliphatic, aromatic, heterocyclic or alicyclic groups or combinations thereof, x, y and z are 0 or 1; and the nitrogen of the N-O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000.

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidne and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis,* Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

The detergent compositions herein may also optionally contain from about 0.005% to 5% by weight of certain types of hydrophilic optical brighteners which also provide a dye transfer inhibition action. If used, the compositions herein will preferably comprise from about 0.01% to 1% by weight of such optical brighteners.

The hydrophilic optical brighteners useful in the present invention are those having the structural formula:

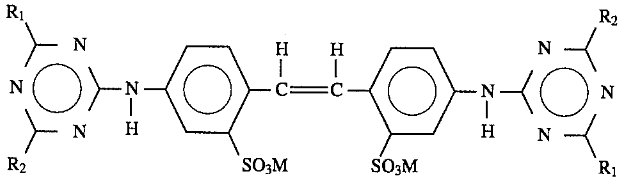

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4'-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

The specific optical brightener species selected for use in the present invention provide especially effective dye transfer inhibition performance benefits when used in combination with the selected polymeric dye transfer inhibiting agents hereinbefore described. The combination of such selected polymeric materials (e.g., PVNO and/or PVPVI) with such selected optical brighteners (e.g., Tinopal UNPA-GX, Tinopal 5BM-GX and/or Tinopal AMS-GX) provides significantly better dye transfer inhibition in aqueous wash solutions than does either of these two detergent composition components when used alone. Without being bound by theory, it is believed that such brighteners work this way because they have high affinity for fabrics in the wash solution and therefore deposit relatively quick on these fabrics. The extent to which brighteners deposit on fabrics in the wash solution can be defined by a parameter called the "exhaustion coefficient". The exhaustion coefficient is in general as the ratio of a) the brightener material deposited on fabric to b) the initial brightener concentration in the wash liquor. Brighteners with relatively high exhaustion coefficients are the most suitable for inhibiting dye transfer in the context of the present invention.

Of course, it will be appreciated that other, conventional optical brightener types of compounds can optionally he used in the present compositions to provide conventional fabric "brightness" benefits, rather than a true dye transfer inhibiting effect. Such usage is conventional $an_d$ well-known to detergent formulations.

Other Ingredients—A wide variety of other ingredients useful in detergent compositions can be included in the compositions herein, including other active ingredients, carriers, hydrotropes, processing aids, dyes or pigments, solvents for liquid formulations, solid fillers for bar compositions, etc. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0.1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, Degussa) is admixed with a proteolytic enzyme solution containing 3%–5% of $C_{13-15}$ ethoxylated alcohol (EO 7) nonionic surfactant. Typically, the enzyme/surfactant solution is 2.5 × the weight of silica. The resulting powder is dispersed With stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 6.5 and about 11, preferably between about 7.5 and 10.5. Automatic dishwashing product formulations preferably have a pH between about 8 and about 11. Laundry products are typically at pH 9–11. Techniques for controlling pH at recommended usage levels include the use of buffers, alkalis, acids, etc., and are well known to those skilled in the art.

The following examples illustrate compositions according to the invention, but are not intended to be limiting thereof.

EXAMPLE

A dry laundry bleach is as follows:

| Ingredient | % (Wt.) |
|---|---|
| Sodium Percarbonate | 20.0 |
| Benzoyl caprolactam activator | 10.0 |
| Mn.catalyst* | 350 ppm |
| BHT | 0.3 |
| Ascorbic acid | 0.3 |
| Water-soluble filler** | Balance |

*$Mn^{IV}_2$(u-O)$_3$(1,4,7-trimethyl-1,4,7-triazacyclononane)$_2$($PF_6$)$_2$, as described in U.S. Pat. Nos. 5,246,621 and 5,244,594.
**Sodium carbonate, sodium silicate mixture (1:1).

In the foregoing composition, the sodium percarbonate can be replaced by an equivalent amount of perborate.

In the foregoing composition, the bleach catalyst can be replaced by an equivalent amount of the following catalysts: $Mn^{III}_2$(u-O)$_1$(u-OAc)$_2$(1,4,7-trimethyl-1,4,7-triazacyclononane)$_2$($ClO_4$)$_2$; $Mn^{IV}_4$(u-O)$_6$(1,4,7-triazacyclononane)$_4$($ClO_4$)$_4$; $Mn^{III}Mn^{IV}_4$(u-O)$_1$(u-OAc)$_2$ (1,4,7-trimethyl-1,4,7-triazacyclononane)$_2$($ClO_4$)$_3$; $Mn^{IV}$(1,4,7-trimethyl-1,4,7-triazacyclononane($OCH_3$)$_3$($PF_6$); Co(2,2'-bispyridylamine)$Cl_2$; Di(isothiocyanato)bis-pyridylamine-cobalt (II); trisdipyridylamine-cobalt(II) perchlorate; Co(2,2-bispyridylamine)$_2$$O_2$$ClO_4$; Bis-(2,2'-bispyridylamine) copper(II) perchlorate; tris(di-2-pyridylamine) iron(II) perchlorate; Mn gluconate; Mn($CF_3SO_3$)$_2$; Co($NH_3$)$_5$Cl; binuclear Mn complexed with tetra-N-dentate and bi-N-dentate ligands, including $N_4Mn^{III}$(u-O)$_2$$Mn^{IV}N_4$)$^+$ and [$Bipy_2Mn^{III}$(u-O)$_2$$Mn^{IV}bipy_2$]-($ClO_4$)$_3$ and mixtures thereof.

Additionally, in the foregoing composition, the bleach activator can be replaced by an equivalent amount of the following activators: benzoyl valerolactam, nonanoyl caprolactam, nonanoyl valerolactam, 4nitrobenzoyl caprolactam, 4-nitrobenzoyl valerolactam, octanoyl caprolactam, octanoyl valerolactam, decanoyl caprolactam, decanoyl valerolactam, undecanoyl caprolactam, undecanoyl valerolactam, 3,5,5-trimethylhexanoyl caprolactam, 3,5,5-trimethylhexanoyl valerolactam, dinitrobenzoyl caprolactam, dinitrobenzoyl valerolactam, terephthaloyl dicaprolactam, terephthaloyl divalerolactam, (6octanamidocaproyl)oxybenzenesulfonate, (6-nonanamidocaproyl)oxybenzenesulfonate, (6-decanamidocaproyl)oxybenzenesulfonate, and mixtures thereof.

The compositions of Example I can be used per se as a bleach, or can be added to a pre-soak or surfactant-containing detergent composition to impart a bleaching benefit thereto.

In the laundry detergent compositions hereinafter, the abbreviated component identifications have the following meanings:

LAS—Sodium $C_{12}$ alkyl benzene sulfonate

TAS—Sodium tallow alkyl sulfate $TAE_n$—Tallow alcohol ethoxylated with n moles of ethylene oxide per mole of alcohol.

25EY—A $C_{12-15}$ predominantly linear primary alcohol condensed with an average of Y moles of ethylene oxide.

TAED—Tetraacetyl ethylene diamine

Silicate—Amorphous sodium silicate ($SiO_2$:$Na_2O$ ratio normally follows)

NaSKS-6—Crystalline layered silicate

Carbonate—Anhydrous sodium carbonate

CMC—Sodium carboxymethyl cellulose

Zeolite A—Hydrated sodium aluminosilicate having a primary particle size in the range from 1 to 10 micrometers.

Citrate—Tri-sodium citrate dihydrate

Ma/AA—Copolymer of 1:4 maleic/acrylic acid, average molecular weight about 80,000.

Enzyme—Mixed proteolytic and amylolytic enzyme sold by Novo Industries AS.

Brightener—Disodium 4,4'-bis(2-morpholino-4-anilino-s-triazin-6-ylamino) stilbene-2:2'-disulfonate.

Suds Suppressor—25% paraffin wax Mpt 50° C., 17% hydrophobic silica, 58% paraffin oil.

Sulfate—Anhydrous sodium sulfate

In use for fabric cleaning, the compositions are employed in conventional manner and at conventional concentrations. Thus, in a typical mode, the compositions are placed in an aqueous liquor at levels which may range from about 100 ppm to about 10,000 ppm, depending on soil load and the stained fabrics are agitated therewith.

EXAMPLE II

The following detergent compositions are prepared (parts by weight).

| | A | B | C | D | E |
|---|---|---|---|---|---|
| LAS | 7.71 | 7.71 | 7.71 | 7.71 | 7.71 |
| TAS | 2.43 | 2.43 | 2.43 | 2.43 | 2.43 |
| TAE11 | 1.10 | 1.10 | 1.10 | 1.10 | 1.10 |
| 25E3 | 3.26 | 3.26 | 3.26 | 3.26 | 3.26 |
| Zeolite A | 19.5 | 19.5 | 19.5 | 13.0 | 13.0 |
| Citrate | 6.5 | 6.5 | 6.5 | — | - |
| MA/AA | 4.25 | 4.25 | 4.25 | 4.25 | 4.25 |
| NaSKS-6 | — | — | — | 10.01 | 10.01 |
| Citric Acid | — | — | — | 2.73 | 2.73 |
| TAE50 | — | — | — | 0.26 | 0.26 |
| Carbonate | 11.14 | 11.14 | 11.14 | 9.84 | 9.84 |
| Perborate | 16.0 | 16.0 | 16.0 | 16.0 | 16.0 |
| Benzoyl caprolactam | 10.0 | 10.0 | — | 5.0 | — |
| TAED | — | 5.0 | 5.0 | 5.0 | 5.0 |
| Mn.Catalyst* (ppm) | 350 | 350 | 350 | 350 | 350 |
| CMC | 0.48 | 0.48 | 0.48 | 0.48 | 0.48 |
| Suds Suppressor | 0.5 | 0.5 | 0.5 | 0.5 | 0.5 |
| Brightener | 0.24 | 0.24 | 0.24 | 0.24 | 0.24 |
| Enzyme | 1.4 | 1.4 | 1.4 | 1.4 | 1.4 |
| Silicate (2.0 ratio) | 4.38 | 4.38 | 4.38 | — | — |
| $MgSO_4$ | 0.43 | 0.43 | 0.43 | 0.43 | 0.43 |
| Perfume | 0.43 | 0.43 | 0.43 | 0.43 | 0.43 |
| Sulfate | 4.10 | 4.10 | 4.10 | 11.67 | 11.67 |
| BHT | 0.3 | 0.3 | 0.3 | 0.3 | 0.3 |
| Ascorbic acid | 0.3 | 0.3 | 0.3 | 0.3 | 0.3 |
| Water and miscellaneous to balance. | | | | | |

*$Mn^{IV}_2$(u-O)$_3$(1,4,7-trimethyl-1,4,7-triazacyclononane)$_2$($PF_6$)$_2$

The above compositions can be modified by the addition of lipase enzymes.

The above compositions can further be modified by replacing the bleach catalyst with an equivalent amount of the bleach catalysts identified in Example I.

The above compositions can also be modified by replacing the benzoyl caprolactam with an equivalent amount of the bleach activators identified in Example I.

The above compositions can also be modified by replacing the TAED with an equivalent amount of NOBS or by leaving the TAED out of the formulation.

The above compositions can also be modified by replacing the perborate with an equivalent amount of percarbonate

EXAMPLE III

A laundry bar with bleach is prepared by standard extrusion processes and comprises: $C_{12-13}$ LAS (20%); sodium tripolyphosphate (20%); sodium silicate (7%); sodium perborate monohydrate (10%); (6-decanamidocaproyl)oxybenzenesulfonate (10%); $Mn^{IV}_2$(u-O)$_3$(1,4,7-trimethyl- 1,4,7-triazacyclononane)$_2$-($PF_6$)$_2$, (1.0%); BHT (0.5%); $MgSO_4$ or talc filler; and water (5%).

The above compositions can be modified by the addition of lipase enzymes.

The above compositions can further be modified by replacing the bleach catalyst with an equivalent amount of the bleach catalysts identified in Example I.

The above compositions can also be modified by replacing the (6decanamidocaproyl)oxybenzenesulfonate bleach activator with an equivalent amount of the bleach activators identified in Example I.

The above compositions can also be modified by replacing the perborate with an equivalent amount of percarbonate All of the granular compositions herein may be provided as spray-dried granules or high density (above 600 g/l) granules or agglomerates. If desired, the Mn-catalyst may be adsorbed onto and into water-soluble granules to keep the catalyst separate from the balance of the compositions, thus providing additional stability on storage. Such granules (which should not contain oxidizable components) can comprise, for example, water-soluble silicates, carbonates and the like.

Although the foregoing compositions are typical of those useful herein, it is most preferred that: (1) the compositions not contain STPP builder; (2) that the nonionic:anionic surfactant ratio be greater than 1:1, preferably at least 1.5:1; and (3) that at least 1% perborate or other chlorine scavenger be present in the compositions to minimize formation of $MnO_2$ in use.

EXAMPLE IV

| | Weight % |
|---|---|
| Zeolite | 38.0% |
| Silicate 2.0R | 6.0% |
| Carbonate (Sodium) | 7.0% |
| Ethylene Diamine Tetra Methylene Phosphonate | 0.2% |
| Brightener 47 (Tinopal DMS) | 0.1% |
| Brightener 49 (Tinopal CBS) | 0.05% |
| Percarbonate | 14.0% |
| TAED | 3.0% |
| Mn Catalyst* (ppm) | 350 |
| Savinase (4.0 KNPU/g) | 2.0% |
| Lipolase (100,000 LU/g) | 0.22% |
| $C_{12-14}$ Alkyl Sulphate | 5.4% |
| $C_{12-14}$ AE4.2 nonionic | 11.2% |
| Soap | 1.0% |
| BHT | 0.3% |
| Ascorbic Acid | 0.3% |
| Miscellaneous/Moist. Balance | 100% |

*$Mn^{IV}_2$(u-O)$_3$(1,4,7-trimethyl-1,4,7-triazacyclononane)$_2$($PF_6$)$_2$

What is claimed is:

1. Laundry bleaching compositions having metal-containing bleach catalyst-induced fabric damage, said composition comprising:

(a) from about 0.5% to about 40% by weight of the composition of a peroxy compound;

(b) from about 50 ppm to about 500 ppm of a metal containing bleach catalyst; and (c) from about 50 ppm to about 2000 ppm of a free radical scavenging antioxidant material selected from the group consisting of BHT, BHA, TBHO, propyl gallate, ascorbic acid, and mixtures thereof whereby fabric damage associated with the metal-containing bleach catalyst is reduced.

2. The laundry bleach compositions according to claim 1 wherein the catalyst is a manganese-containing catalyst.

3. The laundry bleach compositions according to claim 2 wherein the peroxy compound is selected from the group consisting of perborate, percarbonate, and mixtures thereof.

4. The laundry bleach compositions according to claim 3 wherein the catalyst further comprises the ligand 1,4,7-trimethyl-1,4,7-triazacyclononane.

5. The laundry bleach compositions according to claim 2 further comprising a bleach activator.

6. The laundry bleach compositions according to claim 5 wherein the bleach activator is TAED.

7. The laundry bleach compositions according to claim 5 wherein the catalyst is $Mn^{IV}_2(u\text{-}O)_3(1,4,7\text{-trimethyl-}1,4,7\text{-triazacyclononane})_2(PF_6)_2$.

8. A method for laundering fabric comprising contacting fabric in need of laundering with a laundry solution of a composition according to claim 1.

9. Laundry bleaching compositions having metal-containing bleach catalyst-induced fabric damage, said composition comprising:

(a) from about 0.5% to about 40% by weight of the composition of a peroxy compound selected from the group consisting of perborate, percarbonate, and mixtures thereof;

(b) from about 50 ppm to about 500 ppm of a manganese containing bleach catalyst; and (c) from about 50 ppm to about 2000 ppm of a free radical scavenging antioxidant material selected from the group consisting of BHT, BHA, TBHQ, propyl gallate, ascorbic acid, and mixtures thereof whereby fabric damage associated with the metal-containing bleach catalyst is reduced.

10. The laundry bleach compositions according to claim 9 further comprising a bleach activator.

11. The laundry bleach compositions according to claim 10 wherein the bleach activator is TAED.

12. The laundry bleach compositions according to claim 11 wherein the catalyst further comprises the ligand 1,4,7-trimethyl-1,4,7-triazacyclononane.

13. The laundry bleach compositions according to claim 12 wherein the catalyst is $Mn^{IV}_2(u\text{-}O)_3(1,4,7\text{-trimethyl-}1,4,7\text{-triazacyclononane})_2(PF_6)_2$.

14. A method for laundering fabric comprising contacting fabric in need of laundering with a laundry solution of a composition according to claim 13.

15. A method for laundering fabric comprising contacting fabric in need of laundering with a laundry solution of a composition according to claim 9.

* * * * *